(12) United States Patent
Okada et al.

(10) Patent No.: US 9,393,987 B2
(45) Date of Patent: Jul. 19, 2016

(54) STEERING APPARATUS

(71) Applicant: NSK LTD., Tokyo (JP)

(72) Inventors: Shinji Okada, Maebashi (JP); Yuuichi Tomaru, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/764,255

(22) PCT Filed: Nov. 17, 2014

(86) PCT No.: PCT/JP2014/080390
§ 371 (c)(1),
(2) Date: Jul. 29, 2015

(87) PCT Pub. No.: WO2015/076226
PCT Pub. Date: May 28, 2015

(65) Prior Publication Data
US 2015/0367879 A1 Dec. 24, 2015

(30) Foreign Application Priority Data

Nov. 20, 2013 (JP) ................ 2013-240261

(51) Int. Cl.
B62D 1/18 (2006.01)
B62D 1/184 (2006.01)
B62D 1/185 (2006.01)
B62D 1/19 (2006.01)
B62D 5/04 (2006.01)

(52) U.S. Cl.
CPC .............. B62D 1/184 (2013.01); B62D 1/185 (2013.01); B62D 1/195 (2013.01); B62D 5/0421 (2013.01)

(58) Field of Classification Search
USPC .................... 74/492, 493; 280/777
See application file for complete search history.

(56) References Cited

U.S. PATENT DOCUMENTS 3,791,233 A 2/1974 Bane
5,477,744 A * 12/1995 Hoblingre ............. B62D 1/181
280/775
5,605,351 A * 2/1997 Higashino ............. B62D 1/184
280/775
5,803,496 A * 9/1998 Cymbal ................. B62D 1/195
188/374

(Continued)

FOREIGN PATENT DOCUMENTS

JP 49-116738 A 11/1974
JP 51-78533 U 12/1974

(Continued)

OTHER PUBLICATIONS

International Search Report of PCT/JP2014/080390 dated Feb. 17, 2015.

(Continued)

Primary Examiner — Toan To
(74) Attorney, Agent, or Firm — Sughrue Mion, PLLC

(57) ABSTRACT

A steering apparatus includes an input shaft of which one end is connected to a steering wheel, and a steering column that rotatably supports the input shaft. The steering column includes a cylindrical outer column and a cylindrical inner column that is partially inserted into the outer column and guides the outer column in an axial direction. The inner column has a stopper, which regulates a movable range of the outer column in the axial direction, on an outer circumferential surface, and the stopper enlarges the movable range when deformation or movement thereof occurs due to inertial force.

6 Claims, 8 Drawing Sheets

(56) References Cited

U.S. PATENT DOCUMENTS

| | | | | |
|---|---|---|---|---|
| 5,857,703 | A | * | 1/1999 | Kinoshita ............... B62D 1/195 280/775 |
| 2003/0000330 | A1 | | 1/2003 | Murakami et al. |
| 2005/0200113 | A1 | * | 9/2005 | Cymbal ................. B62D 1/195 280/777 |
| 2006/0163861 | A1 | | 7/2006 | Higashino |
| 2011/0185839 | A1 | * | 8/2011 | Inoue ..................... B62D 1/195 74/493 |
| 2012/0080874 | A1 | * | 4/2012 | Narita .................... B62D 1/184 280/777 |
| 2012/0198956 | A1 | * | 8/2012 | Takezawa .............. B62D 1/189 74/493 |
| 2013/0074641 | A1 | * | 3/2013 | Schnitzer ............... B62D 1/184 74/493 |
| 2014/0026707 | A1 | * | 1/2014 | Yokota ................... B62D 1/184 74/493 |
| 2015/0232116 | A1 | * | 8/2015 | Yokota ................... B62D 1/192 74/493 |

FOREIGN PATENT DOCUMENTS

| | | |
|---|---|---|
| JP | 51-115319 U | 8/1975 |
| JP | 54-24431 Y2 | 8/1979 |
| JP | 63-19467 U | 2/1988 |
| JP | 07-081586 A | 3/1995 |
| JP | 2003-002211 A | 1/2003 |
| JP | 2004-017908 A | 1/2004 |
| JP | 2005-001517 A | 1/2005 |
| JP | 2005-138758 A | 6/2005 |
| JP | 2005-343189 A | 12/2005 |
| JP | 2010-241321 A | 10/2010 |

OTHER PUBLICATIONS

Written Opinion of the International Searching Authority of PCT/JP2014/080390 dated Feb. 17, 2015.

* cited by examiner

STEERING APPARATUS

CROSS REFERENCE TO RELATED APPLICATIONS

This is a National Stage of International Application No. PCT/JP2014/080390 filed Nov. 17, 2014, claiming priority based on Japanese Patent Application No. 2013-240261 filed Nov. 20, 2013, the contents of all of which are incorporated herein by reference in their entirety.

BACKGROUND OF THE INVENTION

1. Field of the Invention

The present invention relates to a steering apparatus.

2. Description of the Related Art

Prior Art 1 and 2 disclose techniques of a separation capsule in which when an excessive load is applied to a steering column attached to a vehicle and the steering column is pushed to the front of the vehicle, a part of the supporting structure is separated and the steering column thus moves to the front of the vehicle, thereby protecting a driver (operator) from a thrust (secondary collision) of a steering wheel.

PRIOR ART

Prior Art 1: JP 63-019467 U1
Prior Art 2: JP 07-081586 A

In the techniques disclosed in the Prior Art 1 and 2, since a set value of the separation load at which the steering column moves to the front of the vehicle is lowered by cutting a part of the supporting structure, there is a possibility of occurrence in malfunction, in a case of trying to protect an operator who is light in weight.

The present invention has been made in view of the above problem. An object of the present invention is to provide a steering apparatus which can suppress the malfunction in an ordinary use even when a part of the supporting structure separates to lower the set value of the separation load at which the steering column moves to the front of the vehicle.

SUMMARY OF THE INVENTION

It is an object of the present invention to at least partially solve the problems in the conventional technology. According to an aspect of the invention, a steering apparatus includes an input shaft of which one end is connected to a steering wheel; and a steering column that rotatably supports the input shaft. The steering column includes a cylindrical outer column and a cylindrical inner column that is partially inserted into the outer column and guides the outer column in an axial direction, the inner column has a stopper, which regulates a movable range of the outer column in the axial direction, arranged on an outer circumferential surface, and the stopper has a weight to enlarge the range when the stopper is deformed or moved due to inertial force applied to the weight during a primary collision. The stopper includes a base portion which is fixed to the outer circumferential surface of the inner column, a first arm which has one end fixed to the base portion and is axially arranged from the base portion, a hold portion which is fixed to the other end of the first arm, a second arm which has one end fixed to the hold portion and is arranged outward in a radial direction from the hold portion, and the weight which is fixed to the other end of the second arm.

Thus, in the steering apparatus according to the invention, when the primary collision occurs, the inertial force is applied to the weight of the stopper. The inertial force applied to the weight acts as the force which pulls the hold portion outward in the radial direction of the inner column through the second arm. The radially outward force applied to the hold portion makes the hold portion move outward in the radial direction. As the hold portion moves outward in the radial direction, the radially outward force is applied to the end of the first arm on the hold portion side. The first arm is deformed from the end on the base portion side as a supporting point such that the end on the hold portion side moves outward in the radial direction. Thus, since the end of the first arm on the hold portion side is away from the outer circumferential surface of the inner column, the column-side surface as the surface of the first arm on the inner column side is inclined. The column-side surface is inclined with respect to the outer circumferential surface of the inner column. When the secondary collision occurs after the primary collision, the front end face of the outer column comes in contact with the column-side surface of the first arm. Since the column-side surface of the first arm is inclined with respect to the outer circumferential surface of the inner column, some of the force for moving the outer column toward the front is converted into the force for pushing the column-side surface outward. When the column-side surface of the first arm is pushed outward in the radial direction, the first arm is further deformed. Thus, the outer column moves toward the front while the first arm is further deformed. In addition, the friction occurs between the front end face of the outer column and the column-side surface of the first arm. For this reason, the force for moving the outer column toward the front gradually decreases by the deformation of the first arm and the friction between the front end face of the outer column and the column-side surface of the first arm. In this way, the stopper can absorb the impact applied to the outer column. Accordingly, the steering apparatus according to the invention can easily alleviate the impact to be applied to the operator during the secondary collision.

According to another aspect of the invention, a steering apparatus includes an input shaft of which one end is connected to a steering wheel; a steering column that rotatably supports the input shaft; and a reduction gear connected to the inner column. The steering column includes a cylindrical outer column and a cylindrical inner column that is partially inserted into the outer column and guides the outer column in an axial direction, the inner column has a stopper, which regulates a movable range of the outer column in the axial direction, arranged on an outer circumferential surface, and the stopper has a weight to enlarge the range when the stopper is deformed or moved due to inertial force applied to the weight during a primary collision. The stopper includes a base portion which is fixed to the reduction gear, a first arm which has one end fixed to the base portion and is axially arranged from the base portion, a hold portion which is fixed to the other end of the first arm, a second arm which has one end fixed to the hold portion and is arranged outward in a radial direction from the hold portion, and the weight which is fixed to the other end of the second arm.

The steering apparatus includes a reduction gear connected to the inner column, and the stopper includes a base portion which is fixed to the reduction gear. Thus, when the primary collision occurs, the inertial force is applied to the weight of the stopper. The inertial force applied to the weight acts as the force which pulls the hold portion outward in the radial direction of the inner column through the second arm. The radially outward force applied to the hold portion makes the hold portion move outward in the radial direction. As the hold portion moves outward in the radial direction, the radially outward force is applied to the end of the first arm on the hold portion side. The first arm is deformed from the end on the base portion side as a supporting point such that the end on the hold portion side moves outward in the radial direction. Thus, since the end of the first arm on the hold portion side is away from the outer circumferential surface of the inner column, the column-side surface as the surface of the first arm on the inner column side is inclined. The column-side surface is inclined with respect to the outer circumferential surface of the inner column. When the secondary collision occurs after the primary collision, the front end face of the outer column comes in contact with the column-side surface of the first arm. Since the column-side surface of the first arm is inclined with respect to the outer circumferential surface of the inner column, some of the force for moving the outer column toward the front is converted into the force for pushing the column-side surface outward. When the column-side surface of the first arm is pushed outward in the radial direction, the first arm is further deformed. Thus, the outer column moves toward the front while the first arm is further deformed. In addition, the friction occurs between the front end face of the outer column and the column-side surface of the first arm. For this reason, the force for moving the outer column toward the front gradually decreases by the deformation of the first arm and the friction between the front end face of the outer column and the column-side surface of the first arm. In this way, the stopper can absorb the impact applied to the outer column. Accordingly, the steering apparatus according to the invention can easily alleviate the impact to be applied to the operator during the secondary collision.

As a desirable aspect of the invention, the steering apparatus further includes a steering bracket that tightens and supports the outer column; and a separation capsule that fixes the steering bracket to a vehicle body in a separable manner.

Thus, the steering bracket separates from the vehicle body during the secondary collision, so that the movable range of the outer column is enlarged in the axial direction.

As a desirable aspect of the invention, when the tightening of the steering bracket is released, the outer column is slidable with respect to the inner column, the inner circumferential surface of the outer column comes in contact with the outer circumferential surface of the inner column during the tightening of the steering bracket, and the outer column moves while absorbing the impact by friction with the inner column when a secondary collision occurs.

As a desirable aspect of the invention, the steering apparatus further includes a steering bracket that tightens and supports the outer column; and a separation capsule that fixes the steering bracket to a vehicle body in a separable manner. Thus, the steering bracket separates from the vehicle body during the secondary collision, so that the movable range of the outer column is enlarged in the axial direction.

As a desirable aspect of the invention, when the tightening of the steering bracket is released, the outer column is slidable with respect to the inner column, the inner circumferential surface of the outer column comes in contact with the outer circumferential surface of the inner column during the tightening of the steering bracket, and the outer column moves while absorbing the impact by friction with the inner column when a secondary collision occurs. Thus, the electric power steering apparatus can alleviate the impact to be applied to the operator during the secondary collision.

According to the present invention, it is possible to provide a steering apparatus which can suppress the malfunction in an ordinary use even when a part of the supporting structure is cut and thus the set value of the separation load in which a steering column moves to the front of the vehicle is lowered.

DETAILED DESCRIPTION OF THE PREFERRED EMBODIMENT

Embodiments of the present invention will be described in detail with reference to the drawings. The present invention is not limited by the contents described in the following embodiments. In addition, elements described below include those that are easily conceived by a person skilled in the art and that are substantially the same. Further, the elements described below can be properly combined.

(Embodiment)

Figure 1:
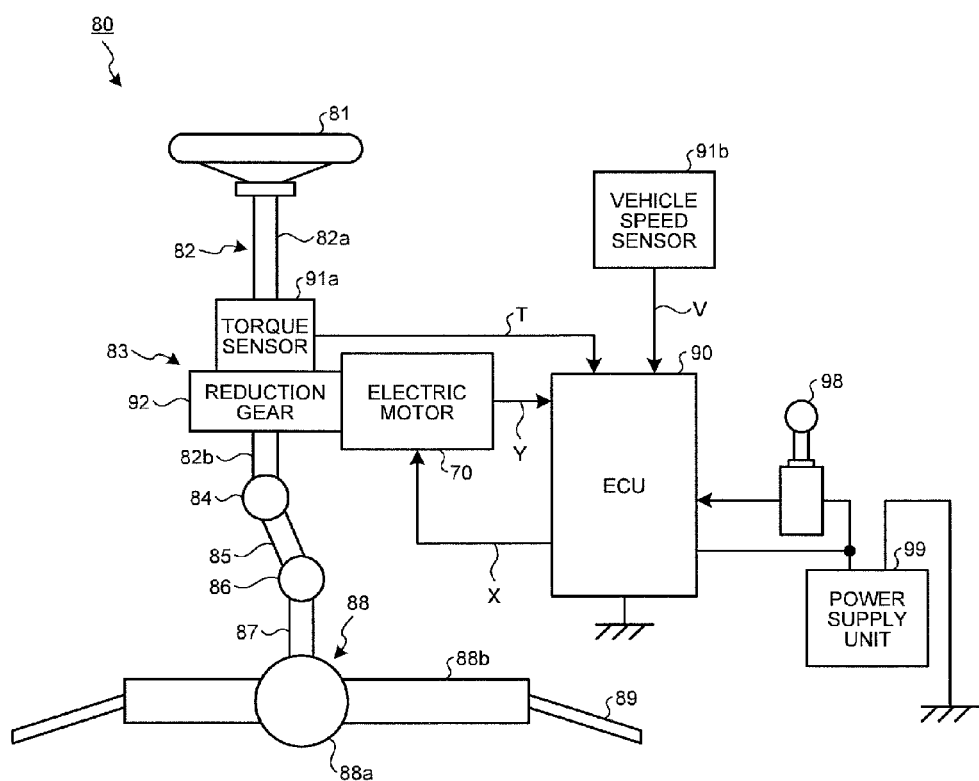
FIG. 1 is a configuration diagram of an electric power steering apparatus provided with an electric motor according to an embodiment.
Figure 2:
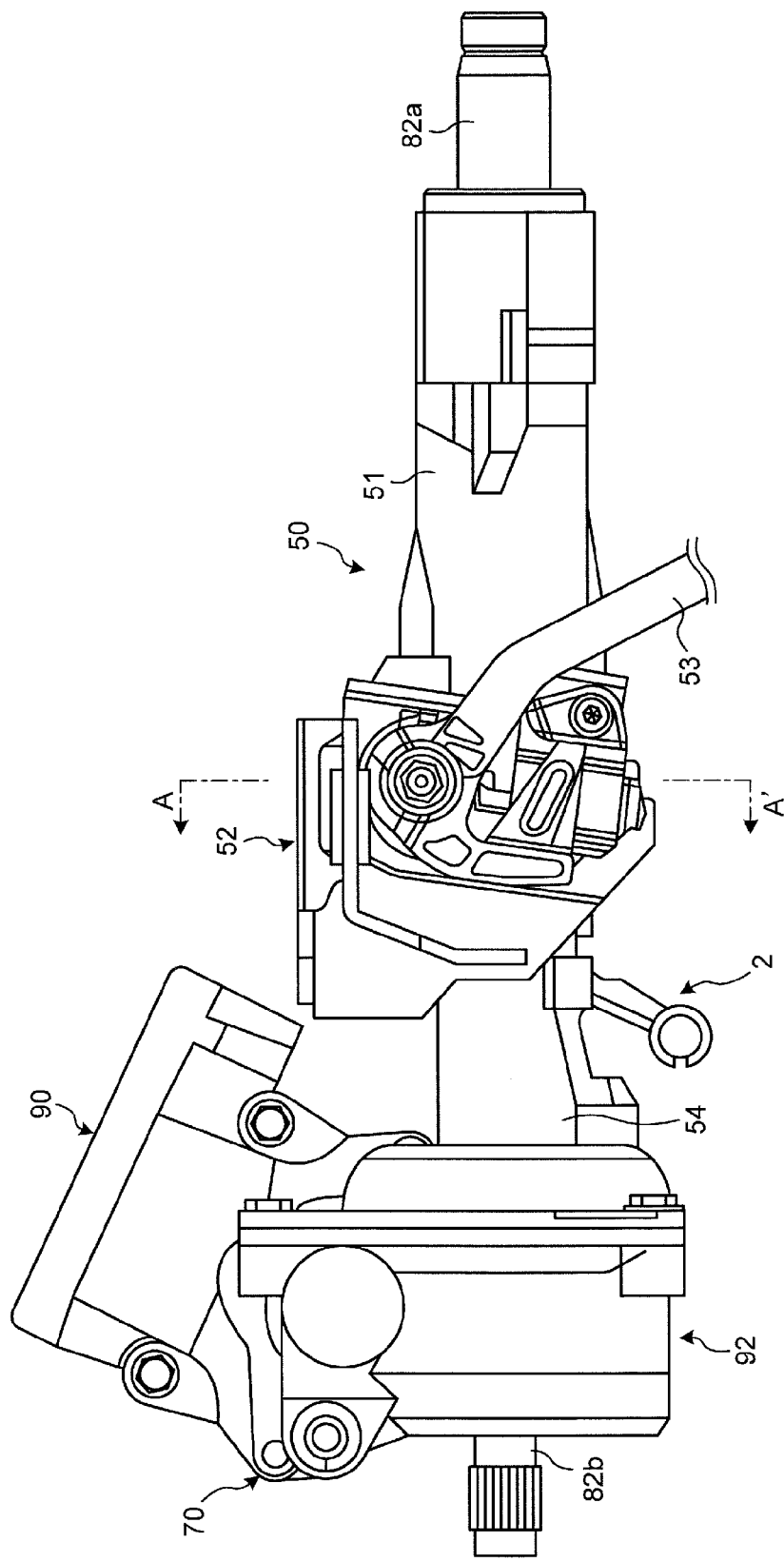
FIG. 2 is a side view schematically illustrating a periphery of a steering column.
Figure 3:
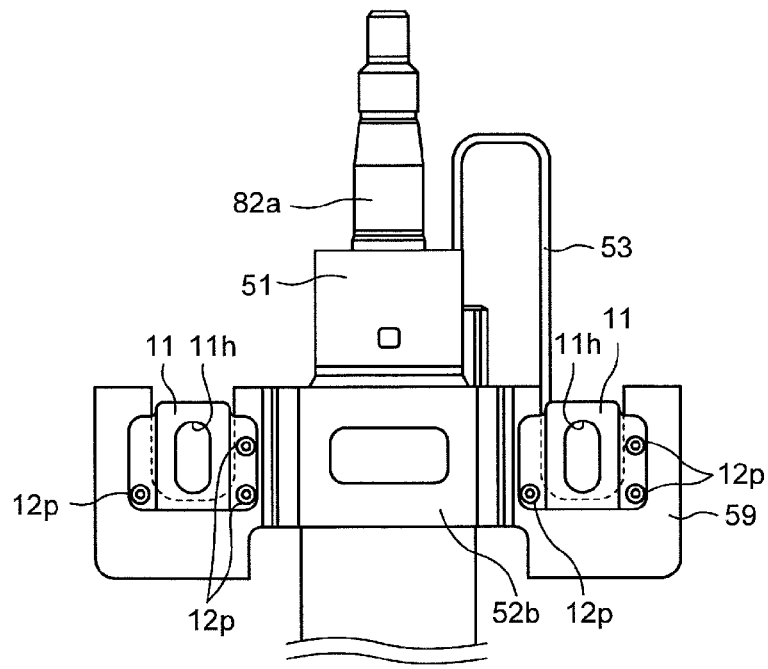
FIG. 3 is a plan view schematically illustrating a portion in which the steering column is attached to a vehicle.
Figure 4:
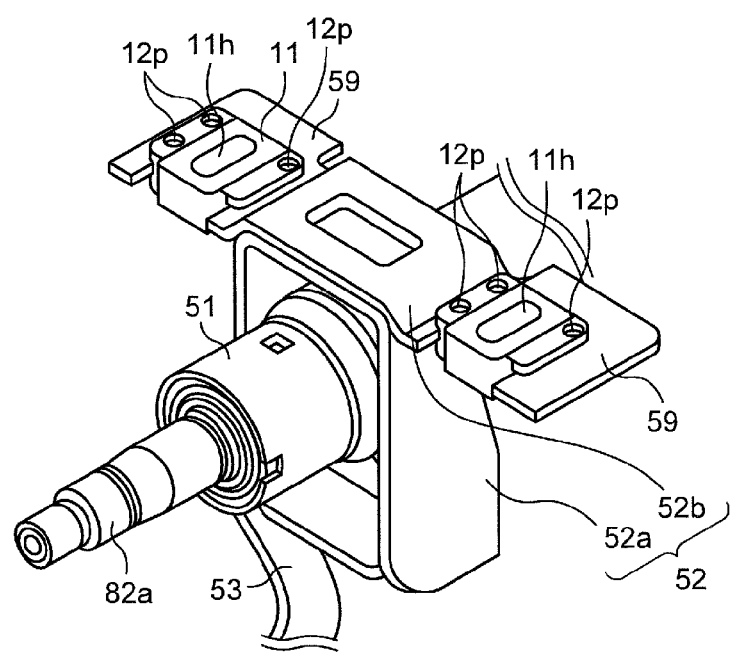
FIG. 4 is a perspective view schematically illustrating a portion in which the steering column is attached to the vehicle.

FIG. 1 is a configuration diagram of an electric power steering apparatus provided with an electric motor according to an embodiment. FIG. 2 is a side view schematically illustrating a periphery of a steering column. FIG. 3 is a plan view schematically illustrating a portion in which the steering column is attached to a vehicle. FIG. 4 is a perspective view schematically illustrating a portion in which the steering column is attached to the vehicle. A steering apparatus according to the present embodiment is exemplified by an electric power steering apparatus 80 and the outline of which will be described with reference to FIGS. 1 to 4. In the following description, furthermore, a front of the vehicle when the electric power steering apparatus 80 is attached to the vehicle is simply described as a front and a rear of the vehicle when the electric power steering apparatus 80 is attached to the vehicle is simply described as a rear. In FIG. 2, the front is a left side in the drawings and the rear is a right side in the drawings.

<Electric Power Steering Apparatus>

From the order in which a force is transmitted by an operator, the electric power steering apparatus 80 includes a steering wheel 81, a steering shaft 82, a steering force assisting mechanism 83, an universal joint 84, a lower shaft 85, an universal joint 86, a pinion shaft 87, a steering gear 88, and a tie rod 89. In addition, the electric power steering apparatus 80 includes an ECU (Electronic Control Unit) 90 and a torque sensor 91a. A vehicle speed sensor 91b is provided in the vehicle and inputs a vehicle speed signal V to the ECU 90 using a CAN (Controller Area Network) communication.

The steering shaft 82 includes an input shaft 82a and an output shaft 82b. One end of the input shaft 82a is connected to the steering wheel 81 and the other end thereof is connected to the steering force assisting mechanism 83 through the torque sensor 91a. One end of the output shaft 82b is connected to the steering force assisting mechanism 83 and the other end thereof is connected to the universal joint 84. In this embodiment, the input shaft 82a and the output shaft 82b are formed of a magnetic material such as iron.

One end of the lower shaft 85 is connected to the universal joint 84 and the other end thereof is connected to the universal joint 86. One end of the pinion shaft 87 is connected to the universal joint 86 and the other end thereof is connected to the steering gear 88.

The steering gear 88 includes a pinion 88a and a rack 88b. The pinion 88a is connected to the pinion shaft 87. The rack 88b is engaged with the pinion 88a. The steering gear 88 is constituted as a rack-and-pinion type. The steering gear 88 converts a rotational motion transmitted to the pinion 88a into a linear motion with the rack 88b. The tie rod 89 is connected to the rack 88b.

The steering force assisting mechanism 83 includes a reduction gear 92 and an electric motor (motor) 70. Further, the electric motor 70 is a so-called brushless motor which is described as an example, but the electric motor 70 may be an electric motor provided with a brush (slider) and a commutator. The reduction gear 92 is connected to the output shaft 82b. The electric motor 70 is an electric motor connected to the reduction gear 92 and for generating auxiliary steering torque. In the electric power steering apparatus 80, the steering shaft 82, the torque sensor 91a, and the reduction gear 92 form a steering column. The electric motor 70 provides the auxiliary steering torque to the output shaft 82b of the steering column. That is, the electric power steering apparatus 80 according to this embodiment is a column assist system.

As illustrated in FIG. 2, the steering force assisting mechanism 83 of the electric power steering apparatus 80 includes a steering column 50 and a steering bracket 52 referred to as an upper attachment bracket, and the steering column 50 and the steering bracket 52 function as a mechanism for supporting each of the portions such as the ECU 90 and the electric motor 70. The steering bracket 52 and the steering column 50 rotatably support the input shaft 82a. The steering column 50 has a double tube structure constituted by an outer column 51 and an inner column 54 which absorb impact energy at the time of collapse and secure a predetermined collapse contract in a coupling portion with the reduction gear 92.

As illustrated in FIGS. 3 and 4, the steering bracket 52 is disposed on an upper side in a vertical direction of the outer column 51. The steering bracket 52 is attached to a vehicle body and supports the outer column 51. The steering bracket 52 includes an attachment plate portion 52b attached to a vehicle body-side member (not illustrated), a frame-shaped support portion 52a formed integrally with the attachment plate portion 52b, and a tilt mechanism constituted to support the outer column 51. The attachment plate portion 52b of the steering bracket 52 is provided with a capsule support portion 59 extending to both sides from the outer column 51. The tilt mechanism is formed in the frame-shaped support portion 52a. The attachment plate portion 52b of the steering bracket 52 includes a pair of right and left separation capsules 11 attached to the vehicle body-side member and capsule support portions 59 fixed to the separation capsules 11, respectively, with resin members 12p formed by resin injections. The separation capsules 11 are formed by aluminum die-casting. The separation capsule 11 has a capsule attachment hole 11h and is fixed to the vehicle body-side member using a bolt or the like to be inserted into the capsule attachment hole 11h. When force acts on the steering column 50 during the collision to move the steering column 50 to the front, the capsule support portion 59 slides to the front of the vehicle body with respect to the separation capsule 11 and thus the resin members 12p are sheared. Thus, the steering column 50 supported by the separation capsule 11 is released and can be separated from the vehicle body.

When a tilt lever 53 of the tilt mechanism rotates, tightening force to the frame-shaped support portion 52a is loosened and thus the support state is released. By this operation, it is possible to adjust a tilt position of the steering column 50 upward and downward. A telescopic position to be described below is also adjustable by the rotation of the tilt lever 53.

The torque sensor 91a illustrated in FIG. 1 detects a steering force by the driver, transmitted to the input shaft 82a through the steering wheel 81, as steering torque. The vehicle speed sensor 91b detects a running speed (vehicle speed) of the vehicle on which the electric power steering apparatus 80 is mounted. The ECU 90 is electrically connected to the electric motor 70, the torque sensor 91a, and the vehicle speed sensor 91b.

(Control unit: ECU)

The ECU 90 controls the operation of the electric motor 70. In addition, the ECU 90 acquires a signal from each of the torque sensor 91a and the vehicle speed sensor 91b. In other words, the ECU 90 acquires steering torque T from the torque sensor 91a, and acquires a vehicle speed signal V of the vehicle from the vehicle speed sensor 91b. Power is supplied to the ECU 90 from a power supply unit (for example, buttery on the vehicle) 99 when an ignition switch 98 is turned ON. The ECU 90 calculates an auxiliary steering command value for an assist command, based on the steering torque T and the vehicle speed signal V. Then, the ECU 90 adjusts a power value X to be supplied to the electric motor 70 based on the calculated auxiliary steering command value. From the electric motor 70, the ECU 90 acquires information of an inductive voltage or rotation information of a rotor such as a resolver to be described below, as operation information Y.

The steering force by the operator (driver) input to the steering wheel 81 is transmitted to the reduction gear 92 in the steering force assisting mechanism 83 through the input shaft 82a. At this time, the ECU 90 acquires the steering torque T, which is input to the input shaft 82a, from the torque sensor 91a and acquires the vehicle speed signal V from the vehicle speed sensor 91b. Then, the ECU 90 controls the operation of the electric motor 70. The auxiliary steering torque generated by the electric motor 70 is transmitted to the reduction gear 92.

The steering torque (including the auxiliary steering torque) output through the output shaft 82b is transmitted to the lower shaft 85 through the universal joint 84 and is further transmitted to the pinion shaft 87 through the universal joint 86. The steering force transmitted to the pinion shaft 87 is transmitted to the tie rod 89 through the steering gear 88, thereby causing the steering wheel to turn.

(Telescopic)

Figure 5:
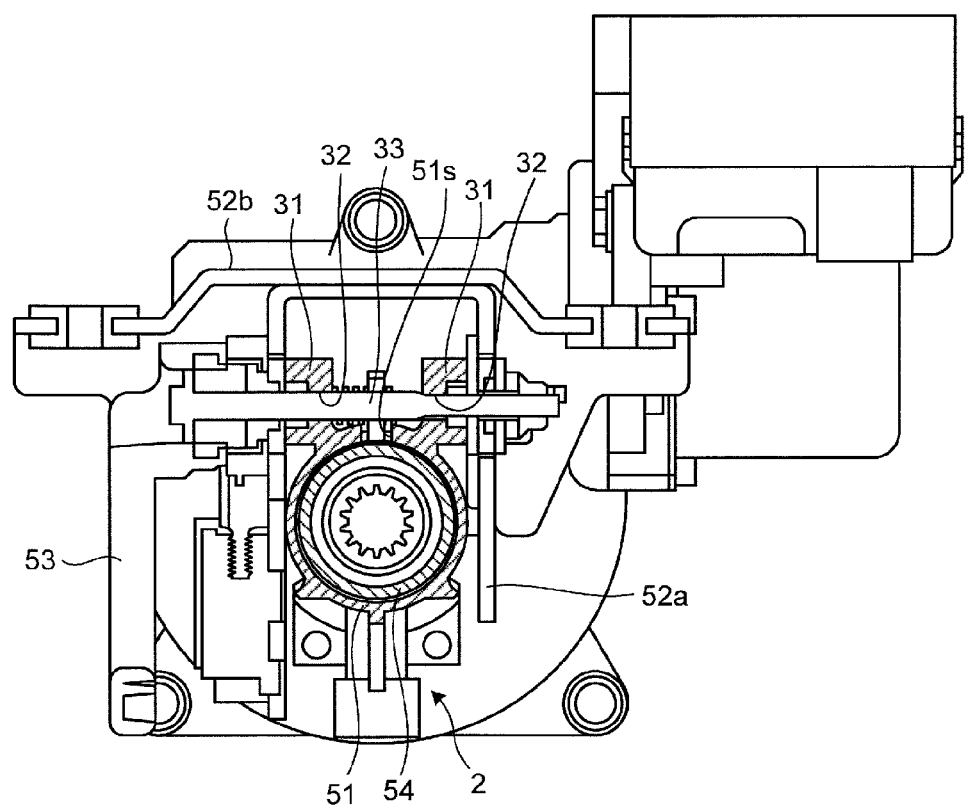
FIG. 5 is a cross-sectional view taken along the line A-A' of FIG. 2.
Figure 6:
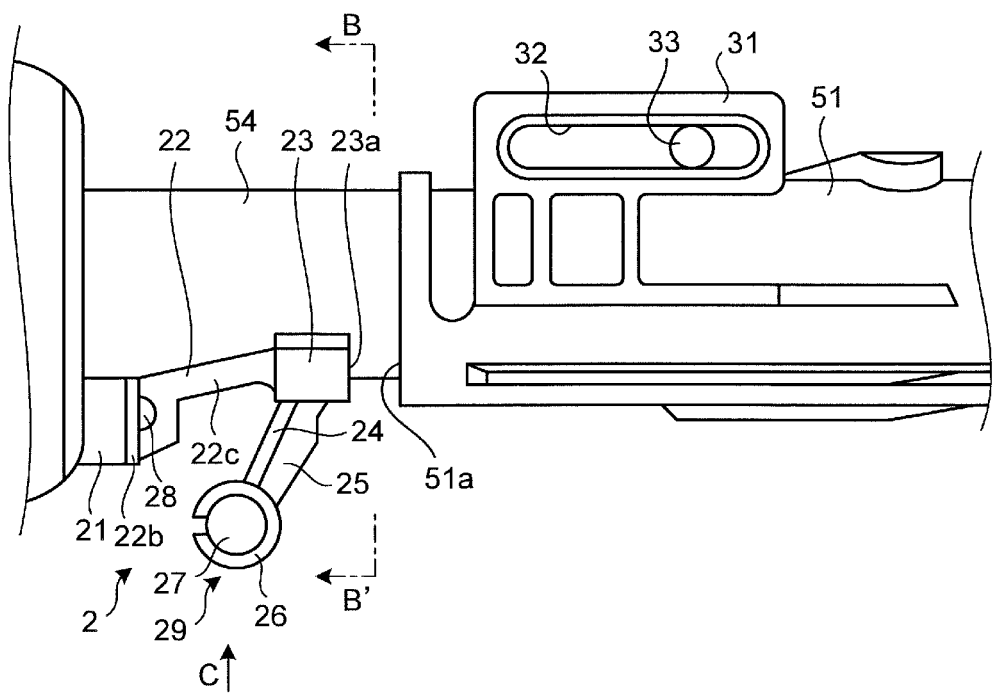
FIG. 6 is a side view illustrating an inner column to be inserted into an outer column.

FIG. 5 is a cross-sectional view taken along the line A-A' of FIG. 2. FIG. 6 is a side view illustrating the inner column to be inserted into the outer column. As illustrated in FIG. 5, the cylindrical outer column 51 includes two telescopic adjustment portions 31 and a slit 51s. The telescopic adjustment portions 31 are portions which project outward in a radial direction from an outer circumferential surface of the outer column 51, respectively and have axially-long holes 32 which are long in an axial direction as illustrated in FIG. 6, respectively. The radial direction is a direction orthogonal to the axial direction of the outer column 51 and has also the same meaning in the following description. The axially-long holes 32 of two telescopic adjustment portions 31 face each other in the direction orthogonal to the axial direction. A rod 33 penetrates into the axially-long hole 32. The rod 33 penetrates into the frame-shaped support portion 52a while penetrating into the axially-long hole 32 and is connected to the tilt lever 53. In addition, the slit 51s is provided on the outer circumferential surface of the outer column 51 and has a long hole which is long in the axial direction.

The inner column 54 is a cylindrical member which is partially inserted into the outer column 51 and guides the outer column 51 in the axial direction. The outer diameter of the inner column 54 has substantially the same size as the inner diameter of the outer column 51. For this reason, during the tightening, the inner circumferential surface of the outer column 51 comes in contact with the outer circumferential surface of the inner column 54 at a portion where the outer column 51 covers the inner column 54. In addition, since the outer column 51 is provided with the telescopic adjustment portion 31 having the axially-long hole 32, it is slidable with respect to the inner column 54 in the range of the length of the axially-long hole 32. For example, during the tightening, the frictional force is set to be 500 N to 600 N when the outer column 51 slides. Therefore, it is less likely that the outer column 51 slides due to the force applied to the steering wheel 81 during the driving operation of the operator.

When the tilt lever 53 rotates, the tightening force with respect to the frame-shaped support portion 52a becomes small, and thus the slit 51s of the outer column 51 increases in width. Thus, since the tightening force of the outer column 51 with respect to the inner column 54 disappears, the frictional force disappears when the outer column 51 slides. Thus, it is possible to adjust the telescopic position as the operator pushes and pulls the outer column 51 through the steering wheel 81 after rotating the tilt lever 53.

(Stopper)

Figure 7:
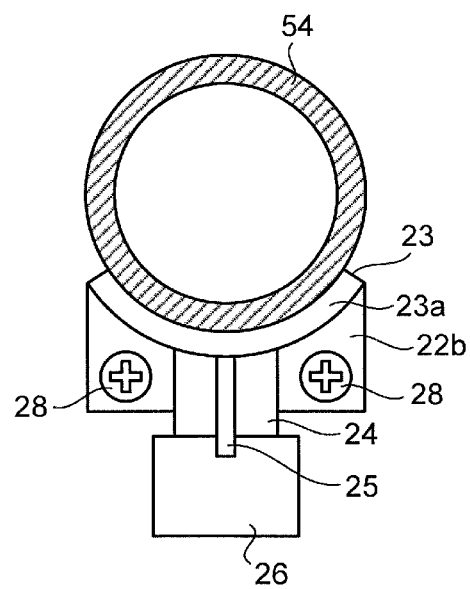
FIG. 7 is a cross-sectional view taken along the line B-B' of FIG. 6.
Figure 8:
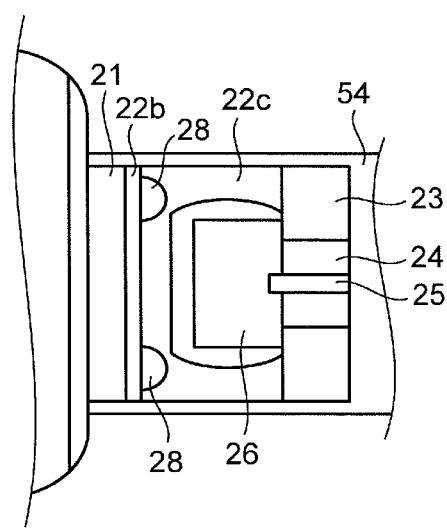
FIG. 8 is a diagram as viewed from the arrow C of FIG. 6.

FIG. 7 is a cross-sectional view taken along the line B-B' of FIG. 6. FIG. 8 is a diagram as viewed from the arrow C of FIG. 6. As illustrated in FIGS. 6 to 8, the inner column 54 has a stopper 2 on the outer circumferential surface thereof. For example, the stopper 2 is disposed on a lower side in a vertical direction of the inner column 54. The stopper 2 is a member for regulating the movable range of the outer column 51 in the axial direction, and includes a base portion 21, a first arm 22, a hold portion 23, a second arm 24, and a weight 29. The stopper 2 may not be disposed on the lower side in the vertical direction of the inner column 54, but for example, may be disposed on the upper side in the vertical direction and at other positions in a circumferential direction.

The base portion 21 is a member provided to project outward in the radial direction from the outer circumferential surface of the inner column 54. For example, the base portion 21 is formed of a synthetic resin or an aluminum alloy and is fixed to the lower side of the outer circumferential surface of the inner column 54 in the vertical direction, by welding.

The first arm 22 is a member which has one end fixed to the base portion 21 and is axially provided from the base portion 21. The first arm 22 includes a fixed portion 22b provided at an end on the base portion 21 side and a deformable portion 22c having a shape such that the deformable portion 22c is arranged toward the rear side from the fixed portion 22b and a part of the deformable portion 22c extends along the outer circumferential surface of the inner column 54. For example, the first arm 22 is formed of an aluminum alloy or a synthetic resin having ductility and is fixed to the base portion 21 with a bolt 28 at the fixed portion 22b. As illustrated in FIG. 8, a center of the deformable portion 22c is formed to be thin in thickness in the circumferential direction thereof. For this reason, a cross-sectional shape of the deformable portion 22c, taken along a plane orthogonal to the axial direction, decreases. Therefore, when force is applied to the first arm 22, the first arm 22 is elastically and facilely deformed. The deformable portion 22c may have any shape which is elastically deformed in a predetermined manner when a primary collision to be described below occurs, without being limited to the shape described above.

As illustrated in FIG. 7, the hold portion 23 is, for example, a semi-cylindrical member having an outer diameter substantially equal to that of the outer column 51. For example, the hold portion 23 is formed of a synthetic resin or an aluminum alloy and is provided at a rear end of the first arm 22.

The second arm 24 is a member which has one end fixed to the hold portion 23 and is provided toward the outside in the radial direction from the hold portion 23. For example, the second arm 24 is formed of a synthetic resin or an aluminum alloy and is provided at the circumferential center on the outer circumferential surface of the hold portion 23. For example, the second arm 24 has a plate shape and is disposed such that two faces having the largest area are directed to the front and rear. For example, the face of the second arm 24 directed to the rear has a reinforcement plate 25. The reinforcement plate 25 is formed of, for example, a synthetic resin or an aluminum alloy. For example, the largest-area face of the reinforcement plate 25 is orthogonal to the largest-area face of the second arm 24. That is, the reinforcement plate 25 is fixed such that the second arm 24 and the reinforcement plate 25 are arranged substantially in a T-shape. Thus, even when force is applied to the second arm 24, the second arm 24 is less likely to be deformed.

The weight 29 includes an outer weight 26 which is, for example, a cylindrical member having a partially opened side and an inner weight 27 which is accommodated inside the outer weight 26. The outer weight 26 is formed of, for example, a synthetic resin or an aluminum alloy and is provided at the end of the second arm 24 on the side opposite to the hold portion 23. The length of the second arm 24 is adjusted such that the outer weight 26 is located more radially outside than the base portion 21. The inner weight 27 is formed of, for example, iron. Since the outer weight 26 has an opening which is formed by notching the side of the outer weight partially, it is possible to adjust the inner diameter thereof by expanding the width of the opening. Therefore, the volume of the inner weight 27 to be accommodated inside the outer weight 26 can be adjusted. It is possible to adjust a total weight of the weight 29 by adjusting a volume or a material of the inner weight 27. Furthermore, the outer weight 26 and the inner weight 27 may be integrally formed.

Figure 9:
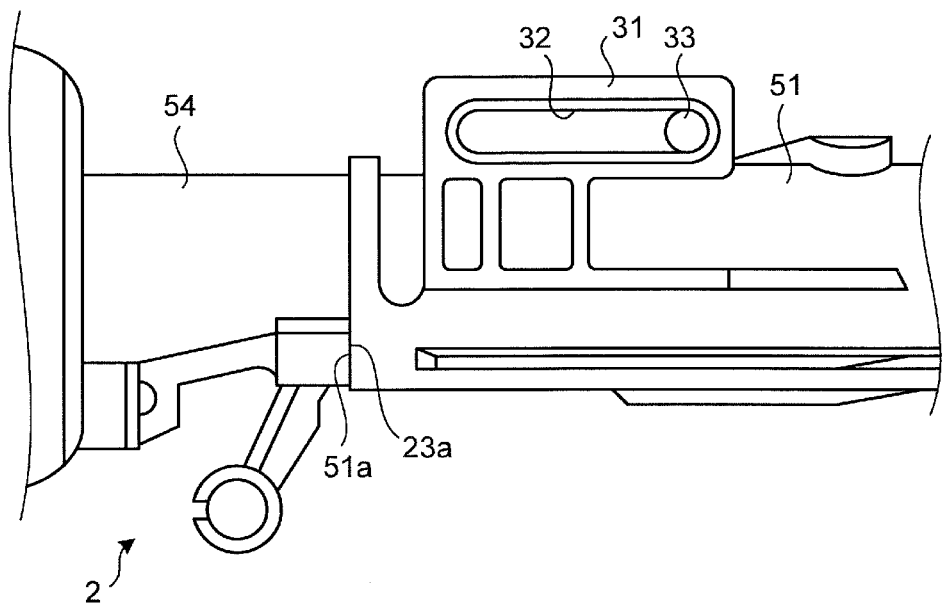
FIG. 9 is a side view illustrating a position relation between the outer column and the inner column when a telescopic position of a steering wheel is at the frontmost position.

FIG. 9 is a side view illustrating a positional relation between the outer column and the inner column when the telescopic position of the steering wheel is at the frontmost position. As illustrated in FIG. 9, when the telescopic position of the steering wheel 81 is at the frontmost position, the rear end of the axially-long hole 32 of the telescopic adjustment portion 31 comes in contact with the rod 33. Since the front and rear positions of the rod 33 are fixed, the movement of the outer column 51 in a longitudinal direction is regulated by the rod 33. In addition, when the telescopic position of the steering wheel 81 is at the frontmost position, a front end face 51a of the outer column 51 comes in contact with an end face 23a on the rear side of the hold portion 23. Thus, the movement of the outer column 51 in the longitudinal direction is regulated by the stopper 2. Therefore, even when an excessive load is applied to the steering wheel 81 during an ordinary use, the excessive load is transmitted to the front through the outer column 51, the stopper 2, and the inner column 54. This suppresses the situation in which the excessive load is transmitted to the separation capsule 11 through the rod 33 and the frame-shaped support portion 52a illustrated in FIG. 5. Accordingly, the electric power steering apparatus 80 can suppress malfunction in the ordinary use. In addition, it is possible to lower a separation load of the separation capsule 11. The ordinary use includes a condition where inertial or impact is applied due to acceleration and deceleration during a driving operation.

Figure 10:
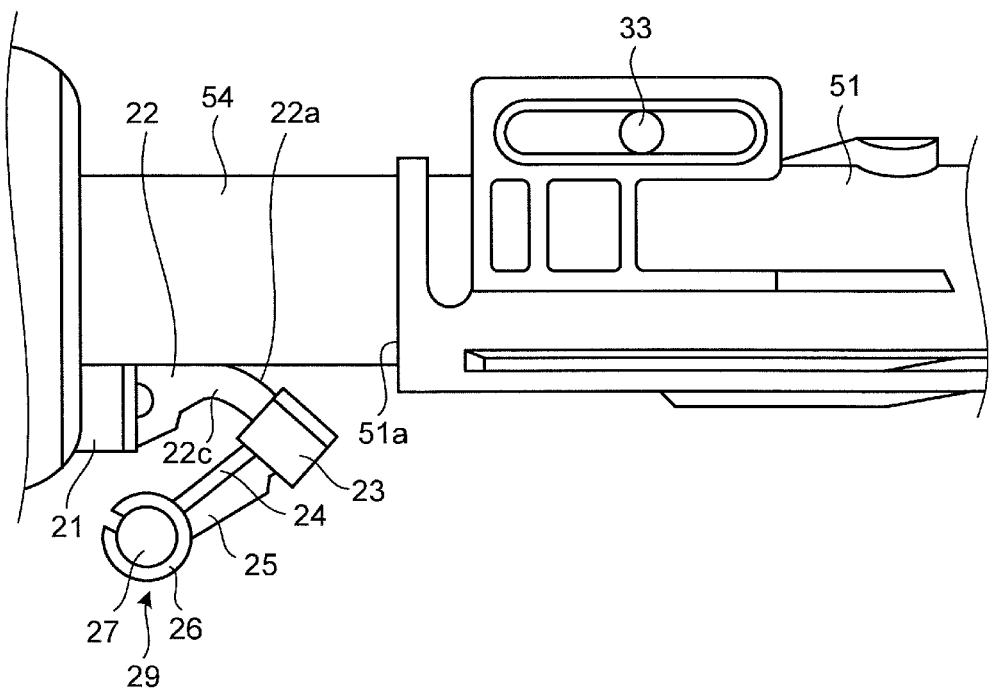
FIG. 10 is a side view illustrating an operation of a stopper when a primary collision occurs.

FIG. 10 is a side view illustrating an operation of the stopper when the primary collision occurs. The primary collision represents a case where a running vehicle collides with other vehicles or the like in a collision accident. When the primary collision occurs, the stopper 2 is deformed by inertial force. Specifically, when the primary collision occurs, the forward inertial force is applied to the vehicle, and thus the forward inertial force is applied to the weight 29 of the stopper 2. The forward inertial force applied to the weight 29 acts as force for pulling the hold portion 23 downward through the second arm 24. The downward force applied to the hold portion 23 moves the hold portion 23 downward. As the hold portion 23 moves downward, the downward force is applied to the end of the first arm 22 on the hold portion 23 side. Thus, the first arm 22 is deformed from the end on the base portion 21 side as a supporting point such that the end on the hold portion 23 side moves downward. Thus, since the hold portion 23 and the end of the first arm 22 on the hold portion 23 side separates from the outer circumferential surface of the inner column 54, a column-side surface 22a, which is a surface of the first arm 22 on the inner column 54 side, is inclined with respect to the outer circumferential surface of the inner column 54. In this way, when the deformation occurs due to the inertial force, since the hold portion 23 separates from the outer circumferential surface of the inner column 54 toward the outside in the radial direction, the stopper 2 can enlarge the movable range of the outer column 51 in the axial direction.

In addition, it is possible to facilely adjust the deformation quantity of the stopper 2 due to the inertial force by adjusting the rigidity of the first arm 22, the length of the second arm 24, the total weight of the weight 29, or the like. Thus, the electric power steering apparatus 80 can appropriately adjust the deformation quantity of the stopper 2 in the ordinary use, so that it is possible to suppress the malfunction in the ordinary use.

The stopper 2 is not necessarily a structure in which the deformation occurs at the time the inertial force acts. The stopper 2 may enlarge the movable range of the outer column 51 in the axial direction by being partially fractured at the time of the action of the inertial force. For example, when the material or shape thereof is adjusted such that the first arm 22 is fractured at the time of the action of the inertial force, the hold portion 23 drops, and thus the stopper 2 can enlarge the movable range of the outer column 51 in the axial direction.

Figure 11:
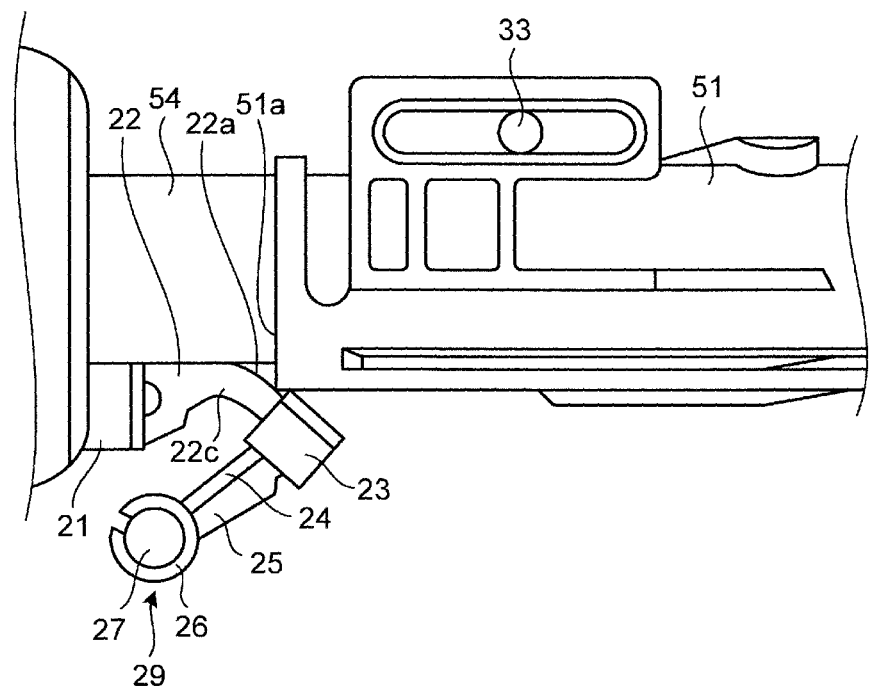
FIG. 11 is a side view illustrating an operation of the outer column when a secondary collision occurs.

FIG. 11 is a side view illustrating an operation of the outer column when secondary collision occurs. The secondary collision represents a case where an operator's body collides with the steering wheel 81 or the like in the collision accident. First, it is assumed that the following description is based on a case where the telescopic position of the steering wheel 81 is not at the frontmost position before the primary collision occurs. When the secondary collision occurs, forward force is applied to the outer column 51 through the steering wheel 81. The force applied to the outer column 51 during the secondary collision is larger than the frictional force when the outer column 51 slides with respect to the inner column 54. For this reason, the outer column 51 moves toward the front while absorbing impact by friction with the inner column 54. The outer column 51 moves toward the front until the rod 33 reaches the rear end of the axially-long hole 32.

The secondary collision occurs immediately after the primary collision occurs. Therefore, when the secondary collision occurs, the hold portion 23 remains in a state of separating from the outer circumferential surface of the inner column 54, as illustrated in FIG. 11. Thus, the movable range of the outer column 51 in the axial direction is enlarged compared to that of the ordinary use. The outer column 51 can move in the axial direction beyond the movable range during the ordinary use. For this reason, the outer column 51 can move to the front in the state where the rod 33 comes in contact with the rear end of the axially-long hole 32. For this reason, when the outer column 51 moves toward the front, the load applied to the outer column 51 is transmitted to the separation capsule 11 through the rod 33 and the frame-shaped support portion 52a illustrated in FIG. 5 without being transmitted to the stopper 2. Thus, the separation capsule 11 is fractured.

In addition, as illustrated in FIG. 9, when the telescopic position of the steering wheel 81 is at the frontmost position in advance before the primary collision occurs, the load is transmitted to the separation capsule 11 immediately after the secondary collision occurs and thus the separation capsule 11 is fractured.

Since the separation capsule 11 is fractured by the secondary collision, the outer column 51 can move toward the front without being regulated by the rod 33. Thus, the outer column 51 can move toward the front beyond a position where there was the hold portion 23 until before the primary collision. For this reason, the outer column 51 can move toward the front while absorbing the impact by the friction with the inner column 54. Thus, the electric power steering apparatus 80 can alleviate the impact to be applied to the operator during the secondary collision.

In addition, when the outer column 51 moves toward the front, the stopper 2 is deformed and thus the column-side surface 22a of the first arm 22 is in the inclined state. The front end face 51a of the outer column 51 comes in contact with the column-side surface 22a of the first arm 22. Since the column-side surface 22a is inclined with respect to the outer circumferential surface of the inner column 54, a part of the force for moving the outer column 51 toward the front is converted into force for pushing the column-side surface 22a downward. When the column-side surface 22a is pushed downward, the deformable portion 22c is further deformed. Thus, the outer column 51 moves toward the front while further deforming the deformable portion 22c. In addition, friction occurs between the front end face 51a on the front side of the outer column 51 and the column-side surface 22a. For this reason, the force for moving the outer column 51 toward the front is exhausted and gradually decreases by the deformation of the deformable portion 22c and the friction between the front end face 51a and the column-side surface 22a. In this way, the stopper 2 can absorb the impact applied to the outer column 51. Accordingly, the electric power steering apparatus 80 according to the embodiment can facilely alleviate the impact to be applied to the operator during the secondary collision.

As described above, the electric power steering apparatus 80 according to the embodiment includes the input shaft 82a, of which one end is connected to the steering wheel 81, and the steering column 50 which rotatably supports the input shaft 82a. The steering column 50 includes the cylindrical outer column 51 and the cylindrical inner column 54 which is partially inserted into the outer column 51 and guides the outer column 51 in the axial direction. The inner column 54 has the stopper 2, which regulates the movable range of the outer column 51 in the axial direction, provided on the outer circumferential surface, and the stopper 2 enlarges the movable range of the outer column 51 when the deformation or movement thereof occurs due to the inertial force.

Thus, in the electric power steering apparatus 80 according to the embodiment, when the primary collision occurs, the stopper 2 is deformed and moves due to the inertial force, enlarges the movable range of the outer column 51 in the axial direction. Therefore, when the secondary collision occurs after the primary collision, the outer column 51 can move in the axial direction beyond the movable range in the axial direction in the ordinary use. For this reason, the rear end of the axially-long hole 32 comes in contact with the rod 33, and the force applied to the outer column 51 is transmitted to the steering bracket 52 through the rod 33 and thus is transmitted to the separation capsule 11 which functions as a supporting structure, so that the separation capsule 11 is fractured and the steering column 50 moves to the front of the vehicle. Meanwhile, in the ordinary use, the stopper 2 regulates the movable range of the outer column 54 in the axial direction together with the axially-long hole 32 of the outer column 54. Thus, even when the excessive load is applied to the outer column 54 in the ordinary use, the excessive load is transmitted to the front through the outer column 51, the stopper 2, and the inner column 54, and thus the force is hardly transmitted to the separation capsule 11. For this reason, the fracture of the separation capsule 11 is suppressed in the ordinary use even when the set value of the separation load of the separation capsule 11 is lowered. Accordingly, the electric power steering apparatus 80 according to the embodiment can suppress the malfunction in the ordinary use even when a part of the supporting structure is cut and thus the set value of the separation load in which the steering column 50 moves to the front of the vehicle is lowered.

Furthermore, in the electric power steering apparatus 80 according to the embodiment, the stopper 2 is provided with the weight 29 and enlarges the movable range of the outer column 51 in the axial direction when the stopper 2 is deformed or moved due to the inertial force applied to the weight 29 during the primary collision.

By the adjustment of the total weight or the like of the weight 29, the deformation quantity and the movement amount of the stopper 2 during the primary collision can be facilely adjusted. Since the electric power steering apparatus 80 can appropriately adjust the deformation quantity of the stopper 2, the malfunction thereof can be suppressed in the ordinary use.

Furthermore, in the electric power steering apparatus 80 according to the embodiment, the stopper 2 includes the base portion 21 which is fixed to the outer circumferential surface of the inner column 54, the first arm 22 which has one end fixed to the base portion 21 and is axially provided from the base portion 21, the hold portion 23 which is fixed to the other end of the first arm 22, the second arm 24 which has one end fixed to the hold portion 23 and is arranged outward in the radial direction from the hold portion 23, and the weight 29 which is fixed to the other end of the second arm 24.

Thus, when the primary collision occurs, the inertial force is applied to the weight 29 of the stopper 2. The inertial force applied to the weight 29 acts as the force pulling the hold portion 23 outward in the radial direction of the inner column 54 through the second arm 24. The radially outward force applied to the hold portion 23 allows the hold portion 23 to move outward in the radial direction. As the hold portion 23 moves outward in the radial direction, the radially outward force is applied to the end of the first arm 22 on the hold portion 23 side. The first arm 22 is deformed such that the end on the hold portion 23 side moves outward in the radial direction, making the end on the base portion 21 side a supporting point. Thus, since the end of the first arm 22 on the hold portion 23 side separates from the outer circumferential surface of the inner column 54, the column-side surface 22a as the surface of the first arm 22 on the inner column 54 side is inclined. The column-side surface 22a is inclined with respect to the outer circumferential surface of the inner column 54. When the secondary collision occurs after the primary collision, the front end face 51a of the outer column 51 comes in contact with the column-side surface 22a of the first arm 22. Since the column-side surface 22a is inclined with respect to the outer circumferential surface of the inner column 54, a part of the force for moving the outer column 51 toward the front is converted into the force for pushing the column-side surface 22a outward in the radial direction. When the column-side surface 22a is pushed outward in the radial direction, the first arm 22 is further deformed. Thus, the outer column 51 moves toward the front while the first arm 22 is further deformed. In addition, the friction occurs between the front end face 51a of the outer column 51 and the column-side surface 22a of the first arm 22. For this reason, the force for moving the outer column 51 toward the front is gradually reduced by the deformation of the first arm 22 and the friction between the front end face 51a of the outer column 51 and the column-side surface 22a of the first arm 22. In this way, the stopper 2 can absorb the impact applied to the outer column 51. Accordingly, the electric power steering apparatus 80 according to the embodiment can facilely alleviate the impact to be applied to the operator during the secondary collision.

Furthermore, the electric power steering apparatus 80 according to the embodiment includes the steering bracket 52 constituted to tighten and support the outer column 51 and the separation capsule 11 constituted to fix the steering bracket 52 to the vehicle body in a separable manner. Thus, the steering bracket 52 separates from the vehicle body during the secondary collision, so that the movable range of the outer column 54 is enlarged in the axial direction.

Furthermore, in the electric power steering apparatus 80 according to the embodiment, when the tightening of the steering bracket 52 is released, the outer column 51 can slide with respect to the inner column 54. The inner circumferential surface of the outer column 51 comes in contact with the outer circumferential surface of the inner column 54 during the tightening of the steering bracket 52, and the outer column 51 moves while absorbing the impact by the friction with the inner column 54 when the secondary collision occurs. Thus, the electric power steering apparatus 80 can alleviate the impact to be applied to the operator during the secondary collision.

The base portion 21 of the stopper 2 may not necessarily be fixed to the outer circumferential surface of the inner column 54. For example, the base portion 21 may be fixed to the reduction gear 92 coupled to the inner column 54. More specifically, as illustrated in FIG. 2, the base portion 21 may be fixed to the reduction gear 92 adjacent thereto by welding or the like.

REFERENCE SIGNS LIST

11 Separation Capsule
11*h* Capsule Attachment Hole
12*p* Resin Member
2 Stopper 21 Base Portion
22 First Arm
22a Column-Side Surface
22b Fixed Portion
22c Deformable Portion
23 Hold Portion
23a End Face
24 Second Arm
25 Reinforcement Plate
26 Outer Weight
27 Inner Weight
28 Bolt
29 Weight
31 Telescopic Adjustment Portion
32 Axially-Long Hole
33 Rod
50 Steering Column
51 Outer Column
51s Slit
52 Steering Bracket
52a Frame-Shaped Support Portion
52b Attachment Plate Portion
53 Tilt Lever
54 Inner Column
59 Capsule Support Portion
70 Electric Motor
80 Electric Power Steering Apparatus
81 Steering Wheel
82 Steering Shaft
82a Input Shaft
82b Output Shaft
83 Steering Force Assisting Mechanism
84 Universal Joint
85 Lower Shaft
86 Universal Joint
87 Pinion Shaft
88 Steering Gear
88a Pinion
88b Rack
89 Tie Rod
90 Ecu
91a Torque Sensor
91b Vehicle Speed Sensor
92 Reduction Gear
98 Ignition Switch
99 Power Supply Unit

The invention claimed is:

1. A steering apparatus comprising:
an input shaft of which one end is connected to a steering wheel; and
a steering column that rotatably supports the input shaft,
wherein the steering column includes a cylindrical outer column and a cylindrical inner column that is partially inserted into the outer column and guides the outer column in an axial direction,
the inner column has a stopper, which regulates a movable range of the outer column in the axial direction, arranged on an outer circumferential surface,
the stopper has a weight to enlarge the range when the stopper is deformed or moved due to inertial force to be applied to the weight during a primary collision, and
the stopper includes a base portion which is fixed to the outer circumferential surface of the inner column, a first arm which has one end fixed to the base portion and is axially arranged from the base portion, a hold portion which is fixed to the other end of the first arm, a second arm which has one end fixed to the hold portion and is arranged outward in a radial direction from the hold portion, and the weight which is fixed to the other end of the second arm.

2. The steering apparatus according to claim 1, further comprising:
a steering bracket that tightens and supports the outer column; and
a separation capsule that fixes the steering bracket to a vehicle body in a separable manner.

3. The steering apparatus according to claim 2, wherein when the tightening of the steering bracket is released, the outer column is slidable with respect to the inner column,
the inner circumferential surface of the outer column comes in contact with the outer circumferential surface of the inner column during the tightening of the steering bracket, and the outer column moves while absorbing the impact by friction with the inner column when a secondary collision occurs.

4. A steering apparatus comprising:
an input shaft of which one end is connected to a steering wheel;
a steering column that rotatably supports the input shaft; and
a reduction gear connected to the inner column,
wherein the steering column includes a cylindrical outer column and a cylindrical inner column that is partially inserted into the outer column and guides the outer column in an axial direction,
the inner column has a stopper, which regulates a movable range of the outer column in the axial direction, arranged on an outer circumferential surface,
the stopper has a weight to enlarge the range when the stopper is deformed or moved due to inertial force to be applied to the weight during a primary collision, and
the stopper includes a base portion which is fixed to the reduction gear, a first arm which has one end fixed to the base portion and is axially arranged from the base portion, a hold portion which is fixed to the other end of the first arm, a second arm which has one end fixed to the hold portion and is arranged outward in a radial direction from the hold portion, and the weight which is fixed to the other end of the second arm.

5. The steering apparatus according to claim 4, further comprising:
a steering bracket that tightens and supports the outer column; and
a separation capsule that fixes the steering bracket to a vehicle body in a separable manner.

6. The steering apparatus according to claim 5, wherein when the tightening of the steering bracket is released, the outer column is slidable with respect to the inner column,
the inner circumferential surface of the outer column comes in contact with the outer circumferential surface of the inner column during the tightening of the steering bracket, and the outer column moves while absorbing the impact by friction with the inner column when a secondary collision occurs.

\* \* \* \* \*